US007951895B2

(12) United States Patent
Ramdani et al.

(10) Patent No.: US 7,951,895 B2
(45) Date of Patent: May 31, 2011

(54) PROCESS FOR PREPARING A SILICONE RESIN

(75) Inventors: Kamel Ramdani, Tupin Et. Semons (FR); Hélène Bossy, Luzinary (FR); Sébastien Lomel, Saint Just Chaleyssin (FR); Nicolas Durand, Lyons (FR)

(73) Assignee: Bluestar Silicones France, Lyons (FR)

( * ) Notice: Subject to any disclaimer, the term of this patent is extended or adjusted under 35 U.S.C. 154(b) by 411 days.

(21) Appl. No.: 12/158,260

(22) PCT Filed: Dec. 19, 2006

(86) PCT No.: PCT/EP2006/069942
§ 371 (c)(1),
(2), (4) Date: Nov. 3, 2008

(87) PCT Pub. No.: WO2007/071690
PCT Pub. Date: Jun. 28, 2007

(65) Prior Publication Data
US 2009/0093605 A1    Apr. 9, 2009

(51) Int. Cl.
*C08G 77/06* (2006.01)

(52) U.S. Cl. ............ 528/39; 524/261; 524/379; 528/10; 528/12; 528/34

(58) Field of Classification Search .................. None
See application file for complete search history.

(56) References Cited

U.S. PATENT DOCUMENTS

| 2,676,182 | A | | 4/1954 | Daudt et al. | |
| 2,814,601 | A | | 11/1957 | Currie et al. | |
| 3,872,217 | A | | 3/1975 | Merz | |
| 6,072,012 | A | * | 6/2000 | Juen et al. | 525/478 |
| 2005/0237854 | A1 | | 10/2005 | Navarro | |

FOREIGN PATENT DOCUMENTS

| EP | 0913187 A2 | 5/1999 |
| EP | 1113036 A2 | 7/2001 |

OTHER PUBLICATIONS

Abstract for FR 2910459 (Jun. 2008).*
"International Search Report," International Patent Application No. PCT/EP06/69942 (Apr. 17, 2007).

* cited by examiner

*Primary Examiner* — Marc S Zimmer
(74) *Attorney, Agent, or Firm* — Baker Donelson Bearman, Caldwell & Berkowitz, P.C.

(57) ABSTRACT

The invention relates to, and the general field of the invention is that of, the synthesis of silicone resins, more particularly the synthesis of silicone resins of type MQ. The process relates to the preparation of MQ silicone resins and permits better control of the operating conditions in the step of the polymerization of a sodium silicate (B) in aqueous medium in the presence of an acid (C) to form a silica hydrosol (polysilicic acid). In the course of the polycondensation step the reactants, a sodium silicate and an acid, are mixed, preferably in continuous fashion, dynamically to form a mixture (3), by means of at least one intensive mixing tool (M) producing a power $\epsilon$ per unit volume of more than 10 kW/m$^3$.

16 Claims, No Drawings

PROCESS FOR PREPARING A SILICONE RESIN

CROSS REFERENCE TO RELATED APPLICATIONS

This application is a §371 National Stage Application of PCT/EP2006/069942 filed Dec. 19, 2006, which claims priority from French Application 0513236 filed Dec. 23, 2005, the content of which is incorporated by reference.

BACKGROUND OF THE INVENTION

1. Field of the Invention

The general field of the invention is that of the synthesis of silicone resins, in particular that of the synthesis of MQ type silicone resins.

2. Description of Related Art

Resins are polymers of relatively low molecular weight having a three-dimensional structure. They have many uses and they find applications in the fields of self-adhesives (for modifying the peel strength), as anti-foaming agents, mold-release additives, paint additives and in many other fields, affecting a large number of industries. Siloxane resins are known which are products that are commercially available and that are used in the preparation of silicone-based products such as adhesives and anti-foaming products. Such resins are sometimes denoted by the term "MQ resins" due to the presence of monovalent siloxyl units (M) and tetravalent units (Q).

They have very varied structures which depend on the amount of trifunctional T or tetrafunctional Q units introduced into the polymer during the manufacture. It is recalled that in silicone chemistry terminology, the siloxane units M, D, T and Q are defined as follows:

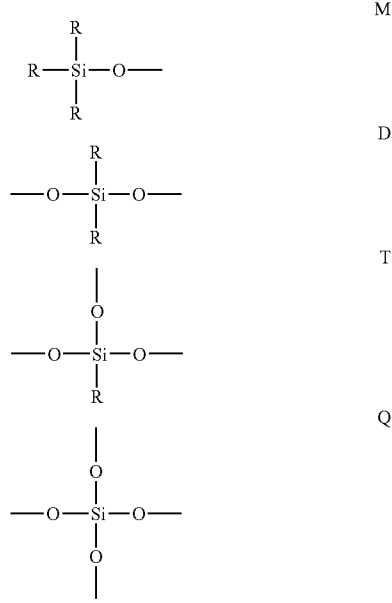

The backbone of MQ resins results from the polycondensation of a liquid silicate, the source of Q units, onto which monofunctional chlorosilanes, the source of M units, are subsequently grafted by hydrolysis of the silanol functional groups that have not polycondensed.

The synthesis of MQ silicone resins occurs, in a first step, by the formation of polysilicic acid. The hydrolysis reaction between sodium silicate and hydrochloric acid is the first step of the process for synthesis of silicone resins. This step consists of building the backbone of the resin by formation of polysilicic acid macromolecules onto which reactive or non-reactive units are subsequently grafted, giving it certain properties. The groups which may be grafted onto the macromolecule are varied and are involved in the usage properties of the resin.

Among the types of non-reactive groups, mention may be made of:
  methyl groups which are the source of the non-stick properties, the hydrophobicity and the surface harness; and
  phenyl groups which provide temperature resistance, high-temperature flexibility and compatibility with organic products.

Among the types of reactive groups (which enable crosslinking on application) mention may be made of:
  hydroxyl groups, which enable crosslinking by condensation at ambient temperature in the presence of a catalyst or in an alkali medium;
  alkoxy groups which hydrolyze to hydroxyl groups at ambient temperature and in the presence of moisture; and
  vinyl groups which react at moderate temperature by addition reaction in the presence of platinum.

These resins, in the absence of solvent, are solid and of white appearance and are handled in a solvent phase either in xylene, toluene or white spirit or in a silicone oil. In solution or in powder form, these compounds are tacky unlike silicone oils which are lubricating instead.

The known processes for synthesizing silicone resins are batch processes, that is to say that at first sodium silicate is run into a suitable reactor over a "bottoms" of dilute hydrochloric acid in order to form the polysilicic acid (PSA). This step is generally carried out in a stirred reactor operating in semi-sealed mode.

Next, a step is carried out in order to slow down the polymerization reaction by addition of an alcohol (quenching step). Next, an organic solvent is then run in which makes it possible to extract the functionalized resin. The functionalization is carried out by running in chlorosilanes, comprising a variable number of chlorines and alkyl groups, which react with the residual silanol functional groups of the polysilicic acid. The functionalization, via the choice of chlorosilanes used, makes it possible to target the application properties of the resin. Again, a new solvent is run in in order to terminate the extraction of the resin in the organic phase. This complementary addition of solvent has the objective of favoring the decantation of the organic phase (containing the resin) from the aqueous phase. Finally, an advancement step may optionally be carried out that consists in reducing the number of residual silanol functional groups after the hydrolysis step is carried out. A potassium hydroxide solution is run in, leading to a consumption of the residual silanol functional groups. The excess of potassium hydroxide is generally neutralized by addition of an acid into the medium, for example phosphoric acid, and the whole mixture is filtered.

Examples of such processes are described, for example, in patents U.S. Pat. No. 2,676,182 (Daudt et al.) and U.S. Pat. No. 2,814,601 (Currie et al.).

However, during the polycondensation step, running in the sodium silicate over the acid bottoms is a step that is tricky to carry out on an industrial scale. A slight variation in the run in time, the temperature, and the concentrations of reactants have serious consequences for the quality of the polysilicic acid formed, backbone of the final resin. This is because, according to the conditions for carrying out the synthesis, localized gels, or even setting of the medium, are observed in the reactor. This step is a determining factor in the quality of the final resin obtained.

Such processes therefore have a not insignificant variability per batch of MQ resins manufactured and only offer a little flexibility in the operating parameters such as the flow rates for running in the reactants and the amount of reactants. Furthermore, they do not impart flexibility as regards the possibility of preparing MQ resins of low molecular weight.

More recently, Patent Application EP 1 113 036 describes a process for the continuous preparation of silicone resins comprising, in addition, the following steps:
a) a continuous polymerization of sodium silicate, in an aqueous medium, in the presence of an acid to form a silica sol rapidly followed by a continuous step of quenching by addition of an alcohol; and
b) a continuous capping by addition of an organosilane in a water/organic solvent reaction mixture.

This reference also describes a "semi-continuous" configuration where the polycondensation reaction is carried out continuously in a tubular reactor with in-line injection of sodium silicate or in a loop reactor, then the downstream steps are carried out in a sealed reactor. It is indicated that the molecular weight of the silica sol depends on the reaction temperature and also on the residence time of the reactants: sodium silicate/acid. Thus, the synthesis of low-viscosity resin is achieved by ensuring a short residence time (less than one minute) of the sodium silicate/acid reactants. If not, for the synthesis of higher molecular weight resins, the recommended residence time for the preparation of polysilicic acid is between 1 and 5 minutes. The examples of reactors described that make it possible to achieve this constraint linked to the residence time of the reactants necessary for the synthesis of the polysilicic acid are:
- a stirred column having several stages (a Scheibel type column, preferred configuration, each stage corresponding to one step of the process);
- a tubular reactor comprising static mixers (plug-flow static mixer reactor), and
- a loop where the hydrochloric acid circulates with injection of sodium silicate (packed plug-flow reactor).

It should be noted that when low-viscosity resins are desired, the process described requires a rapid addition of the quenching agent (alcohol) for the polymerization reaction, this being in order to prevent too high a polycondensation of the polysilicic acid and therefore a rapid increase in the viscosity. Another lever for controlling the viscosity of the MQ resin obtained is to act on the duration of the functionalization step (see, for example, examples 2 and 4).

Although the process briefly described above provides a satisfactory technical solution to the difficulties explained above, it is however, desirable to provide improvements, especially as regards the control of the operating conditions of the polycondensation step leading to the formation of polysilicic acid. This is because, the process described above and those of the prior art do not allow great flexibility on an industrial level since during the polycondensation step leading to the formation of polysilicic acid, the flow rate and the concentration must be carefully controlled so as to keep the molar ratio [$SiO_2$ of the sodium silicate/acid] in a restricted value range in order to prevent the reaction medium from setting as a gel.

It is also known that any variation, even a minor variation, in the pH can modify the equilibrium conditions of the polycondensation reaction. Furthermore, sodium silicate is extremely sensitive to concentration phenomena and, consequently, any variation, even a minor variation, of the flow rates of the reactants can modify the dilution of the silicate in the medium.

SUMMARY OF THE INVENTION

Under these circumstances, one of the main objectives of the present invention is to provide a novel process for preparing silicone resins, in particular that of synthesizing MQ type silicone resins, enabling a better control of the operating conditions of the polymerization step of a sodium silicate (B) in an aqueous medium and in the presence of an acid (C) to form a silica hydrosol (polysilicic acid).

The novel process according to the invention has the advantage of giving a greater flexibility as regards the flow rates and concentrations of the reactants during the polymerization step of sodium silicate (B) without having to suffer the drawbacks linked to the sensitivity to the pH and to the concentration of the reactants in the reaction medium.

The process according to the invention also has the advantage of being able to prepare resins having low, medium and high viscosities in a wide range of reactant concentrations during the polymerization step of sodium silicate (B) while controlling the reaction. This flexibility of the process is an important advantage during industrial implementation.

Other objectives and advantages of the present invention will appear on reading the description which follows.

In order to achieve this objective, the inventors have had the merit of demonstrating that the reaction system is composed of rapid processes, the progress of which is greatly disturbed by concentration and pH gradients generated by standard mixing conditions.

It is to the inventors credit that they have demonstrated, quite surprisingly and unexpectedly, that during the polymerization, in particular continuous polymerization, of a sodium silicate (B) in aqueous medium and in the presence of an acid (C) to form a silica hydrosol (polysilicic acid), adequate control of the speed and of the quality of the mixing of the reactants of this polycondensation step makes it possible to be free from the constraints described above. Owing to the process according to the invention, it is now possible to work with a greater concentration range of reactants (sodium silicate (B) and acid (C)) during the polycondensation step. The polycondensation step according to the invention is also less sensitive to the pH of the reaction mixture, giving greater flexibility to the process, whereas with a process according to the prior art using non-intensive mixing tools this criteria is limiting.

This is remarkable in every respect, since the prior art says nothing as regards the use of an intensive mixing tool that dissipates a power density s greater than $10 kW/m^3$ during the step of continuous polycondensation of sodium silicate during the preparation of silicone resins, in particular those of the MQ type.

Currently, one of the most common techniques used for mixing two or more liquids consists in using a reactor equipped with a mechanical stirrer of impeller, turbine or other type and in injecting the reactants into the reactor. However, the energy dissipated by the mechanical stirring does not make it possible to achieve micromixing times that are short enough to carry out rapid and complex reactions and are unsuitable in the case of the polymerization, in particular continuous polymerization, of a sodium silicate (B) where the viscosity increases rapidly over time.

It is pointed out that the mixers used in Patent Application EP 1 113 036 for mixing the reactants necessary for the step of continuous polymerization of sodium silicate do not make it possible to obtain mixing times of less than one second.

These objectives, amongst others, are achieved by the present invention which firstly relates to a process for preparing a silicone resin (A) comprising:

a step a) which consists of the polymerization, preferably continuous, of a sodium silicate (B) in an aqueous medium and in the presence of an acid (C) to form a silica hydrosol (polysilicic acid), said process being characterized in that:

at least one fluid (1) comprising the sodium silicate (B) in an aqueous phase and at least one fluid (2) comprising the acid (C) are mixed by continuous dynamic mixing, the streams meeting each other at a single point to form a mixture (3) using at least one intensive mixing tool (M) dissipating a power density $\epsilon$ greater than 10 kW/m$^3$, preferably greater than 20 kW/m$^3$ and more preferably still 20 kW/m$^3$<$\epsilon$<10$^6$ kW/m$^3$;

the mixture (3) is recovered at the outlet of the intensive mixing tool; and the polymerization reaction is continued with the mixture (3) within a reactor (R1) to form the silica hydrosol (polysilicic acid).

DETAILED DESCRIPTION OF A PREFERRED EMBODIMENT

Without wishing to limit the invention to one scientific theory, the formation of polysilicic acid could be explained by the following two reactions (1) and (2), which in a simplified form may be summarized thus:

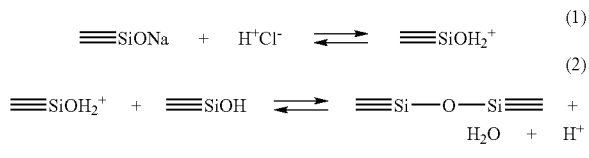

The reaction (1) (formation of the oxonium ion) is a rapid reaction (well below one second) whereas the reaction (2) (polycondensation reaction) is slower. However, other complex parallel-concurrent and/or consecutive-concurrent reactions linked to the sensitivity to pH, to the concentration of reactants of the reaction medium and to depolycondensation phenomena have an influence on the overall balance of the reaction.

It has therefore surprisingly been found that mixing the reactants in a shorter time than the characteristic time of certain reactions participating in the preparation of polysilicic acid makes it possible to be free of the constraints described above.

It is in this way that the Applicant discovered that during the continuous polymerization of a sodium silicate it is important to obtain mixing, with an intensive mixing tool, of the two reactant fluids (separately comprising the sodium silicate and the acid) in a shorter time than the characteristic time of certain reactions participating in the preparation of polysilicic acid.

Preferably, the intensive mixing tool (M) will be chosen so as to obtain a mixing residence time t1 of the fluids (1) and (2) in the intensive mixing tool (M) of less than or equal to 0.1 s and preferably 0.0001 s≦t1≦0.1 s.

The intensive mixing tool (M) is mainly differentiated from conventional mixing tools (stirred tank, static mixers of Kenics or Sulzer type, loop reactor, etc.) by the miniaturization of these dimensions (injection channels, mixing chamber) and its internal structuring. These two characteristics result in a high power density being dissipated when the mixing of two fluids is carried out. As an example of an intensive mixing tool (M), mention may be made of tangential-jet mixers, mixers that operate by impact of free jets (that is to say without contact of the jets with the walls of the mixer) and rotor-stator type mixers. This list is not limiting and consequently any type of intensive mixing tool adapted to mixing at least two reactive fluids capable of dissipating a power density $\epsilon$ greater than 10 kW/m$^3$ will be suitable within the sense of the invention.

For example, one intensive mixing tool (M) may be a tangential-jet mixer. In this case, according to a preferred mode of the invention, the flow rate of each reactant is divided into two streams which are introduced into the mixer in a diametrically opposed, but slightly offset manner. The injection channels of the reactants have a small diameter (between 0.5 and 5 mm) over a length of a few millimeters for the inlets, the outlet channel has a diameter between 3 and 10 mm.

By way of comparison, in a static mixer combined with a Schiebel-type column such as described in Patent Application EP 1 113 036, the power dissipated cannot exceed 5 kW/m$^3$ and consequently this type of mixer is not suitable as an intensive mixing tool according to the invention.

The sodium silicate (B) is generally introduced into the intensive mixing tool (M) in the form of an aqueous solution for which the weight content of $SiO_2$ varies between 5% and 70% and preferably between 5% and 20%.

The sodium silicate (B) generally has an $SiO_2/Na_2O$ molar ratio of at least 2, preferably of at least 2.5 and more preferably still of at least 3.0.

The acid (C) makes it possible to induce the polymerization of the sodium silicate (B) in order to form polysilicic acid.

According to one particular embodiment, the acid (C) is added so that the pH of the mixture (3) is preferably 2.

As an example of the acid (C), mention may be made of:

inorganic acids such as: hydrochloric acid, nitric acid, hydrobromic acid, hydrogen iodide, sulfuric acid, phosphoric acid, sulfonic acid, carbonic acid and mixtures thereof; and organic acids such as: acetic acid, propionic acid, formic acid, benzoic acid, salicylic acid, sebacic acid, adipic acid, dicarboxylic acids, oleic acid, palmitic acid, stearic acid and mixtures thereof.

According to one preferred embodiment, the acid (C) is chosen from the group composed of: hydrochloric acid, nitric acid, hydrobromic acid, hydrogen iodide, sulfuric acid, phosphoric acid, sulfonic acid and mixtures thereof. Preferably the acid (C) is hydrochloric acid (HCl).

The acid (C) is generally introduced into the intensive mixing tool (M) in the form of an aqueous solution, for which the weight concentration of acid varies between 5 and 99%, preferably between 5 and 35% and more preferably still between 10 and 25%.

According to one advantageous embodiment of the invention, the molar ratio: $SiO_2$ from the sodium silicate (B)/HCl is between 0.2 and 2.0, preferably between 0.6 and 1.4.

According to another particular embodiment, the conditions for mixing the fluids (1) and (2) respectively comprising sodium silicate (B) and the acid (C) in aqueous phases are chosen so as to obtain a mixture (3) comprising:

from 50 to 95% by weight and preferably from 75 to 95% by weight of water;

from 1 to 25% by weight and preferably from 1 to 15% by weight of sodium silicate (B); and from 0.5 to 10% by weight and preferably from 2 to 10% by weight of acid (C).

Another advantage of the invention is that when the polymerization reaction is continued with the mixture (3) inside a reactor (R1) to form the silica hydrosol (polysilicic acid), the process according to the invention gives greater latitude for starting the quenching step in order to slow down the polymerization reaction by addition of an alcohol (D).

According to one preferred mode of the invention, the residence time t2 of the polymerization reaction of the mixture (3) is less than or equal to 120 min, preferably t2≦60 min and more preferably still 1 s≦t2≦10 min.

Another advantage of the invention is in providing a variant in the process for preparing a silicone resin (A) characterized in that after the step a) a supplementary step b') is carried out that consists in adding, preferably continuously, to the mixture (3):
  at least one alcohol (D) as an extraction solvent, and
  at least one organosilica compound (E) and at least one liquid (F) chosen from the group composed of: organic solvents, siloxane fluids and mixtures thereof.

Thus, the alcohol (D) acts as an extraction solvent since the alcohol (D), the organosilica compound (E) and the liquid (F) are added practically simultaneously or simultaneously to the mixture (3).

This variant of the process for preparing a silicone resin (A) is now possible when the polycondensation step is carried out using an intensive mixing tool (M) according to the invention. It offers a novel route in the processes for preparing silicone resins, especially as regards the industrial implementation and the specifications of resins obtained according to the process of the invention.

According to another embodiment of the invention, after the step a) a supplementary step b) is carried out consisting in slowing down (quenching step) the polymerization reaction by addition, preferably continuous, of an alcohol (D).

Examples of alcohols (D) that can be used according to the invention are, for example, water-soluble and polar organic compounds such as organic alcohols for instance methanol, ethanol, isobutanol, isopropanol (IPA), n-butanol, n-propanol, glycols such as ethylene glycol and propylene glycol and mixtures thereof. Preferably, the alcohol (D) is a $C_1$-$C_{12}$ alcohol and more preferably still the alcohol is chosen from the group composed of: isopropanol, methanol, ethanol and mixtures thereof.

In general, the alcohol (D) is added to the reaction medium pure or in aqueous solution, preferably in contents between 50 and 99% by weight of alcohol.

According to one particular embodiment, the polymerization [step a)] and the quenching step [step b)] are carried out at a temperature between 0° C. and 75° C., preferably between 15° C. and 40° C. and more preferably still between 15° C. and 25° C.

According to another embodiment of the invention, after the step b) a supplementary functionalization (capping) step c) is carried out that consists of the addition, preferably continuous, of an organosilica compound (E) and of at least one liquid (F) chosen from the group composed of: organic solvents, siloxane fluids and mixtures thereof.

Examples of organosilica compounds (E) are, for example: silica compounds of formulae:

where:
  n is 1,2 or 3;
  the groups Z, being identical or different, each represent a halogen, preferably chlorine, a hydroxyl, an alkoxy, preferably a $C_1$-$C_8$ alkoxy, or an —$OSiR^1_3$ group, and
  the R and $R^1$ radicals, being identical or different, each represent a hydrogen atom or a $C_1$ to $C_{20}$ saturated or unsaturated hydrocarbon-based monovalent radical that is substituted or unsubstituted, aliphatic, cyclic or aromatic.

As examples of organosilica compounds (E) mention may be made of the following compounds: trimethylchlorosilane, phenyldimethylchlorosilane, trimethylethoxysilane, trimethylisopropoxysilane, tolylmethyldichlorosilane, hexamethyldisiloxane, dimethylchlorosilane, phenyltrichlorosilane, hexamethyldisiloxane, tearyltrichlorosilane, monotolylsiloxane, triethylchlorosilane, ethyldimethylchlorosilane, tetramethyldisiloxane, trifluorotolylmethyldichlorosilane, chlorophenyldimethylchlorosilane, methyldivinylchlorosilane and mixtures thereof.

The amount of organosilica compounds (E) varies depending on the nature of the compound chosen. In general, it is possible to use an amount between 0.1 mol and 3.0 mol, preferably between 0.5 mol and 1.5 mol of organosilica compound (E) per mole of $SiO_2$ units contained in the silica hydrosol (polysilicic acid).

As examples of the liquid (F) in which the MQ resin is soluble and in which the alcohol (D) is relatively insoluble, mention may be made, for example, of hexamethyldisiloxane, toluene, xylene, linear or branched hydrocarbons such as heptane, octane and isodecane and mixtures thereof.

The amount of liquid (F) that can be used according to the invention is, for example between 5 and 75% by weight and preferably between 20 and 40% by weight.

According to one particular embodiment, the functionalization step c) is carried out at a temperature between 25° C. and 100° C., preferably between 40° C. and 85° C. and more preferably still between 75° C. and 85° C.

According to another embodiment, the residence time for the functionalization step is greater than or equal to 5 minutes. During this step, the pH is preferably less than 7, preferably between 1 and 6 and more preferably still between 0 and 4.

According to one particularly advantageous embodiment of the invention, after the step b') or c) a supplementary step d) is carried out which consists in separating the reaction medium into two phases: an aqueous phase and an organic phase comprising the silicone resin (A) and said liquid (F).

According to another embodiment of the invention, after the step d) a supplementary step e) is carried out which consists in isolating said organic phase and in removing said liquid (F) (stripping step) in order to isolate said resin (A). The stripping technique is well known to a person skilled in the art and therefore does not require a detailed description.

The organic phase may be isolated by any method known to a person skilled in the art, for example by the decantation technique which may be carried out in batch mode or continuously. Next, the resin (A) may be filtered by any method known to a person skilled in the art.

According to one particularly advantageous variant, after the step d) a supplementary step e') is carried out in which the amount of residual silanol groups of the silicone resin (A) is reduced while removing said liquid (F) in order to isolate said resin (A).

Preferably, the amount of residual silanol groups of the silicone resin (A) are reduced by condensation of the residual silanol groups in the presence of an alkali metal catalyst or by making the residual silanol groups react in the presence of silazane(s) or of halogenated silane derivative(s).

As examples of alkali metal catalysts mention may be made, for example, of NaOH, LiOH and KOH. The preferred alkali metal catalyst is KOH.

As examples of silazanes mention may be made, for example, of hexamethyldisilazane or halogenated silane derivatives such as trimethylchlorosilane.

A specific language is used in the description so as to facilitate the understanding of the principle of the invention. It should nevertheless be understood that no limitation of the scope of the invention is envisioned by the use of this specific language. Modifications, improvements and perfections may especially be envisioned by a person acquainted with the technical field in question based on his own general knowledge.

Other details or advantages of the invention will appear more clearly in view of the examples given below solely by way of indication.

EXPERIMENTAL SECTION

Example 1

Invention—Preparation of An MQ$^{OH}$ Silicone Resin With A Polycondensation Step Carried Out With A Tangential-jet Intensive Mixing Tool 1-1) An MQ$^{OH}$ resin having an M/Q ratio of 0.8 was prepared in a continuous process according to the following description:

The reaction was carried out, at 20° C., between a sodium silicate at 50% by weight in water (solution A), (SiO$_2$ content of the silicate was 30% by weight and SiO$_2$/Na$_2$O molar ratio was 3.3), and an aqueous hydrochloric acid solution containing 18% by weight of HCl (solution B) with an SiO$_2$/HCl molar ratio equal to 0.85. The reaction was carried out in a tangential-jet intensive mixing tool (M) having a dissipated power of 100 kW/m$^3$ and a mixing time t1 of 5 ms (0.005 s), with respective flow rates of solution A and solution B of 40 kg/h and 20 kg/h. The flow of each reactant was divided into two streams which were introduced into the mixer in a diametrically opposed, but slightly offset manner. The injection channels of the reactants had a diameter around 1 mm over a length of a few millimeters for the inlets, the outlet channel had a diameter of around 4 mm. The temperature of the reactants was 20° C. The product of the reaction, polysilicic acid, was characterized in average weight distribution by chromatographic analysis.

1-2) Part of the stream of polysilicic acid was directly sent into a piston reactor (R1) kept at 20° C. The flow rate of polysilicic acid in question was 4.5 kg/h. The residence time t2 of the polycondensation step in the reactor (R1) was 3 min. A sample was removed for chromatographic analysis.

1-3) The polysilicic acid was sent to a continuous perfectly stirred reactor where a mixture of isopropanol and of chlorosilanes [(CH$_3$)$_3$SiCl] was introduced, the respective flow rates were 1 kg/h and 0.6 kg/h. Xylene was also introduced into this reactor at a flow rate of 0.9 kg/h. The reactor was kept at 75° C. The residence time in the reactor was 20 minutes. The reaction mixture was sent to a continuous decanter. The temperature in the decanter was kept at 75° C., and the residence time was 20 minutes. The organic phase was then devolatilized in continuous mode to obtain the final resin containing 60% of solids in xylene, and to remove the residual volatiles. The final resin had a viscosity of 12 centipoise at 60% solids and a silanol content of 2.4% by weight.

In step 1-1) it is observed that the reaction between the silicate and the acid was carried out at 20° C., that is to say that the process according to the invention does not need to keep the reactor at temperatures below 10° C., which is an advantage for an industrial implementation.

In step 1-3) it is observed that the process according to the invention allowed a variant which consisted in adding isopropanol at the same time as the chlorosilane. This variant, until now unknown in the prior art, enables greater flexibility for an industrial implementation.

Example 2

Invention—Preparation of An MQ$^{OH}$ Silicone Resin With A Polycondensation Step Carried Out With A Tangential-jet Intensive Mixing Tool 2-1) The operating procedure described in paragraph 1-1) of Example 1 was repeated, then 2-2) the reaction medium was sent to a perfectly stirred batch-type reactor (R'1) kept at 20° C. The residence time t2 for the polycondensation step in the reactor (R'1) was 3 min.

2-3) Next, isopropanol (flow rate of 1 kg/h) then the chlorosilanes [(CH$_3$)$_3$SiCl], with a flow rate of 0.6 kg/h were introduced. Xylene was then introduced into this reactor at a flow rate of 0.9 kg/h. The temperature of the reactor was raised to 75° C. over one hour, then kept at this temperature for one hour. The stirring was stopped in order to decant the organic phase containing the resin.

The organic phase was then devolatilized to obtain the final resin containing 60% of solids in xylene. The final MQ$^{OH}$ resin had a viscosity of 10 cpoise at 60% solids and a silanol content of 2.7% by weight.

Example 3

Change In the Weight-average Molecular Weights As A Function of the Concentration of Reactants For the Polycondensation Step 3-1) A series of tests was carried out under the same conditions as Example 1 but by varying the concentrations of the reactants from step 1-1) (mixing with an intensive tool). The polysilicic acid obtained at the outlet of the intensive mixing tool (M) and of the piston reactor (R1) was characterized by the technique of size-exclusion liquid chromatography (see Table 1 for results). The average weights of the polymer did not vary (or only a little), round 9000 g/l in polystyrene equivalents. At the outlet of the piston reactor R2, the average molecular weights were 1100 g/mol. In the functionalization step, the [(CH$_3$)$_3$SiCl]/[SiO$_2$ from the silicate] ratio was kept constant and was equal to 1.8. The final resins obtained were identical in viscosity and % of silanol. The amounts of xylene were adjusted so as to obtain a final product containing 60% by weight of resin.

3-2) As a comparative test 1, the silicate was run over a bottoms of HCl in a perfectly stirred reactor of batch type (R'1), with a dissipated power of 4 kW/m$^3$, kept at 20° C. A sample was removed for analysis at the end of the running-in process (3 minutes).

3-3) As a comparative test 2, a series of tests were repeated which were carried out under the same conditions as Example 3-1), but using a non-intensive mixing tool (loop reactor, described in Patent Application EP 1 113 036).

TABLE 1

| [SiO$_2$] mol/l before mixing | [HCl] mol/l before mixing | Invention Example 3-1) | | Comparative Example 3-2) | Comparative 2 Example 3-2) |
|---|---|---|---|---|---|
| | | M$_w$ of the PSA from the mixer (M) | M$_w$ of the PSA after passing into the reactor (R1) | M$_w$ of the PSA at the end of running in the silicate | M$_w$ of the PSA from the mixer |
| 2.39 | 3.96 | 8700 | 10 000 | 12 000 | 10 800 |
| 2.39 | 5.75 | 9000 | 11 000 | 13 000 | 12 000 |
| 2.39 | 6.37 | 8900 | 12 000 | 18 000 | 18 000 |
| 2.39 | 8.60 | 9000 | 15 000 | 26 000 | — |

The weight-average molecular weight (M$_W$) of the polysilicic acid (PSA) is expressed by weight relative to polystyrene.

It is observed that the process according to the invention made it possible to obtain, at the outlet of the intensive mixing tool, a polysilicic acid with a weight-average molecular weight that was constant even when the HCl concentration was/was greatly varied. This is not observed for the comparative test where variations of around 116% were observed for the extreme limits of the range studied.

Furthermore, even with equivalent residence times (3 minutes), the intensive mixing tool made it possible to obtain a polysilicic acid of lower weight-average molecular weight than in the comparative example (difference of 73%).

TABLE 2

| [SiO$_2$] mol/l before mixing | [HCl] mol/l before mixing | Invention Example 3-1) | | Comparative Example 3-2) |
|---|---|---|---|---|
| | | M$_w$ of the PSA from the mixer (M) | M$_w$ of the PSA after passing into the reactor (R1) | M$_w$ of the PSA at the end of running in the silicate |
| 2.40 | 5.75 | 9000 | 11 000 | 12 500 |
| 2.80 | 5.75 | 9000 | 11 000 | 14 000 |
| 3.20 | 5.75 | 9100 | 11 500 | 18 000 |
| 3.60 | 5.75 | 9100 | 12 000 | 27 000 |

The same observations apply when the SiO$_2$ concentration of the sodium silicate is varied.

Example 4

Sodium silicate at 50% by weight in water (solution A), silicate characterized by an SiO$_2$ content of the silicate of 26% by weight and an SiO$_2$/Na$_2$O molar ratio of 3.4 and an aqueous solution of hydrochloric acid containing 16.5% by weight of HCl (solution B) were reacted with an SiO$_2$/HCl molar ratio equal to 1. The reaction was carried out in a tangential-jet intensive mixing tool (M) (invention, having a mixing time t1 of 5 ms and a dissipated power of 100 kW/m$^3$) or with a non-intensive mixing tool (loop reactor, technology similar to the reactor described in Example 4 of Patent Application EP 1 113 036, dissipated power <5 kW/m$^3$, of around 2 kW/m$^3$, comparative test) with respective flow rates of the solutions A and B that were varied. The temperature of the reactants was 20° C.

TABLE 3

| Flow rates of the reactants | | Invention | Comparative |
|---|---|---|---|
| Sodium silicate flow rate (kg/h) | HCl flow rate (kg/h) | M$_w$ of the PSA from the mixer (M) | M$_w$ of the PSA at the outlet of the loop reactor |
| 40 | 40 | 8300 | 13 800 |
| 40 | 20 | 8200 | 10 800 |

It is observed that the process according to the invention made it possible to obtain, at the outlet of the intensive mixing tool, a polysilicic acid with a weight-average molecular weight that was constant even when the HCl flow rates were varied. This was not observed for the comparative test where variations of around 30% were observed for the extreme limits of the range studied. At the outlet of the intensive mixing tool, according to the operating conditions, the weight-average molecular weights obtained are lower (by 65% and 32%), which enables the synthesis of a resin having a lower viscosity than according to a non-intensive mixing tool.

Example 5

Preparation of An MQ$^{OH}$ Silicone Resin of Low Viscosity With A Polycondensation Step Carried Out With A Tangential-jet Intensive Mixing Tool 5-1) An MQ$^{OH}$ resin having an M/Q ratio of 0.8 was prepared in a continuous process according to the following description:

The reaction was carried out, at 20° C., between a sodium silicate at 50% by weight in water (solution A), (SiO$_2$ content of the silicate was 30% by weight and SiO$_2$/Na$_2$O molar ratio was 3.3), and an aqueous hydrochloric acid solution containing 18% by weight of HCl (solution B) with an SiO$_2$/HCl molar ratio equal to 0.85. The reaction was carried out in a tangential-jet intensive mixing tool (M) having a dissipated power of 100 kW/m$^3$ and a mixing time t1 of 5 ms (0.005 s), with respective flow rates of solution A and solution B of 40 kg/h and 20 kg/h. The flow of each reactant was divided into two streams which were introduced into the mixer in a diametrically opposed, but slightly offset manner. The injection channels of the reactants had a diameter around 1 mm over a length of a few millimeters for the inlets, the outlet channel had a diameter of around 4 mm. The temperature of the reactants was 20° C. The product of the reaction, polysilicic acid, was characterized in average weight distribution by chromatographic analysis.

5-2) Part of the stream of polysilicic acid was sent to a continuous perfectly stirred reactor then a mixture of isopropanol and of chlorosilanes [(CH$_3$)$_3$SiCl] was introduced, the respective flow rates were 1 kg/h and 0.6 kg/h. Xylene was also introduced into this reactor at a flow rate of 0.9 kg/h. The reactor was kept at 75° C. The residence time in the reactor was 30 minutes. The reaction mixture was then sent to a decanter operating in continuous mode. The temperature in the decanter was kept at 75° C., and the residence time was 20 minutes. The organic phase was then devolatilized in continuous mode to obtain the final resin containing 60% of solids in xylene, and to remove the residual volatiles. The final resin had a viscosity of 5.8 centipoise at 60% solids and a silanol content of 2.4% by weight.

Example 6

Preparation of An $M^{Vi}Q$ Silicone Resin (Vi=Vinyl) With A Polycondensation Step Carried Out With A Tangential-jet Intensive Mixing Tool 6-1) An $M^{Vi}Q$ resin was prepared in a continuous process according to the following description:

The reaction was carried out, at 20° C., between a sodium silicate at 50% by weight in water (solution A), ($SiO_2$ content of the silicate was 30% by weight and $SiO_2/Na_2O$ molar ratio was 3.3), and an aqueous hydrochloric acid solution containing 18% by weight of HCl (solution B) with an $SiO_2/HCl$ molar ratio equal to 0.85. The reaction was carried out in a tangential-jet intensive mixing tool (M) having a dissipated power of 100 kW/m³ and a mixing time t1 of 5 ms (0.005 s), with respective flow rates of solution A and solution B of 40 kg/h and 20 kg/h. The flow of each reactant was divided into two streams which were introduced into the mixer in a diametrically opposed, but slightly offset manner. The injection channels of the reactants had a diameter around 1 mm over a length of a few millimeters for the inlets, the outlet channel had a diameter of around 4 mm. The temperature of the reactants was 20° C. The product of the reaction, polysilicic acid, was characterized in average weight distribution by chromatographic analysis.

6-2) Part of the stream of polysilicic acid was sent to a continuous perfectly stirred reactor then a mixture of isopropanol and of chlorosilanes [$(CH_3)_3SiCl$ and $(CH_2)(Vi)SiCl_2$, where Vi=vinyl] was introduced, the respective flow rates were 1 kg/h and 1.2 kg/h. Xylene was also introduced into this reactor at a flow rate of 0.9 kg/h. The reactor was kept at 75° C. The residence time in the reactor was 30 minutes. The reaction mixture was then sent to a decanter operating in continuous mode. The temperature in the decanter was kept at 75° C., and the residence time was 20 minutes. The organic phase was then devolatilized in continuous mode then followed by a potassium hydroxide feed in order to reduce the silanol content. The final resin had a viscosity of 9.5 centipoise at 60% solids and a silanol content of 0.2% by weight and a vinyl content of 3% by weight.

The invention claimed is:

1. A process for preparing a silicone resin comprising:
   polymerization, of a sodium silicate in an aqueous medium and in the presence of an acid to form a silica hydrosol (polysilicic acid), wherein
   at least one first fluid comprising the sodium silicate in an aqueous phase and at least one second fluid comprising the acid are mixed by continuous dynamic mixing, the streams meeting each other at a single point to form a mixture using at least one intensive mixing tool dissipating a power density $\epsilon$ of at least 10 kW/m³;
   the mixture is recovered at the outlet of the intensive mixing tool; and
   the polymerization is continued with the mixture within a reactor to form the silica hydrosol (polysilicic acid).

2. The process for preparing a silicone resin as claimed in claim 1, wherein said process is carried out with a mixing residence time t1 of the fluids first and second in the intensive mixing tool of less than or equal to 0.1 s and preferably 0.0001 s≦t1≦0.1 s.

3. The process for preparing a silicone resin as claimed in claim 1, wherein the residence time t2 of the polymerization reaction of the mixture is not more than 120 min.

4. The process for preparing a silicone resin (A) as claimed in claim 1, further comprising adding, to the mixture:
   at least one alcohol as an extraction solvent, and
   at least one organosilica compound and at least one liquid selected from the group consisting of organic solvents, and siloxane fluids.

5. The process for preparing a silicone resin as claimed in claim 1, further comprising in slowing down the polymerization reaction by addition, of an alcohol.

6. The process for preparing a silicone resin as claimed in claim 5, further comprising addition, of an organosilica compound and of at least one liquid selected from the group consisting of: organic solvents, and siloxane fluids.

7. The process for preparing a silicone resin as claimed in claim 6, the liquid is selected from the group consisting of: hexamethyldisiloxane, toluene, xylene, a linear hydrocarbon-based compound and a branched hydrocarbon-based compound.

8. The process for preparing a silicone resin as claimed in claim 4, further comprising separating the mixture into two phases: an aqueous phase and an organic phase comprising the silicone resin and said liquid.

9. The process for preparing a silicone resin as claimed in claim 8, further comprising isolating said organic phase and removing said liquid in order to isolate said silicone resin.

10. The process for preparing a silicone resin as claimed in claim 9, wherein said silicon resin is filtered.

11. The process for preparing a silicone resin as claimed in claim 8, further comprising reducing residual silanol groups of the silicone resin while removing said liquid in order to isolate said silicone resin.

12. The process for preparing a silicone resin as claimed in claim 11, wherein the amount of residual silanol groups of the silicone resin is reduced by condensation of residual silanol groups in the presence of an alkali metal catalyst and/or by making residual silanol groups react in the presence of at least one silazane or at least one halogenated silane derivative.

13. The process for preparing a silicone resin as claimed in claim 2, further comprising in slowing down the polymerization reaction by addition, of an alcohol.

14. The process for preparing a silicone resin as claimed in claim 3, further comprising in slowing down the polymerization reaction by addition, of an alcohol.

15. The process for preparing a silicone resin as claimed in claim 6, further comprising separating the mixture into two phases: an aqueous phase and an organic phase comprising the silicone resin and said liquid.

16. The process for preparing a silicone resin as claimed in claim 7, further comprising separating the mixture into two phases: an aqueous phase and an organic phase comprising the silicone resin and said liquid.

* * * * *